Aug. 22, 1944.  P. T. BRANTINGHAM  2,356,375
AUTOMOTIVE VEHICLE
Filed May 27, 1942   3 Sheets-Sheet 3
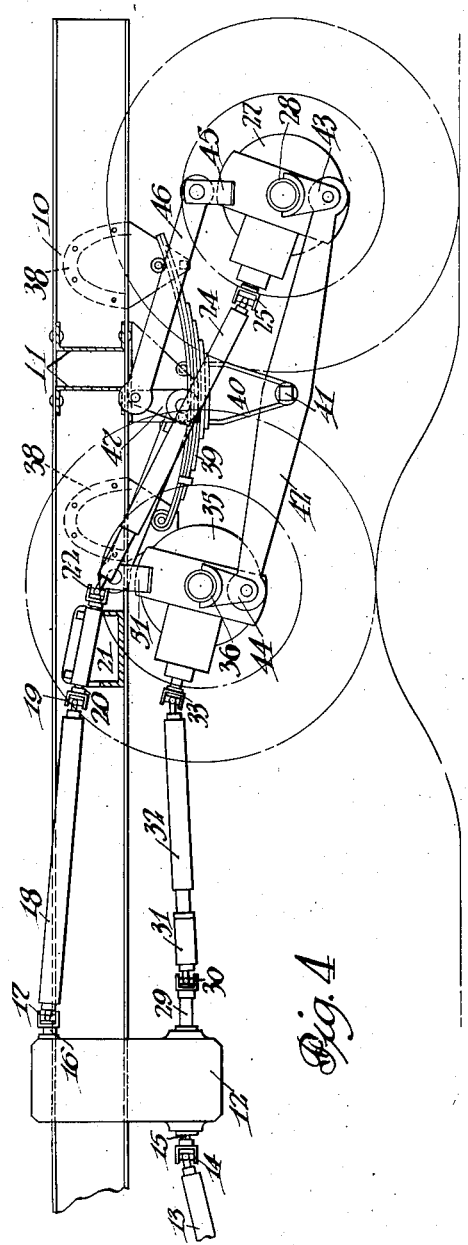
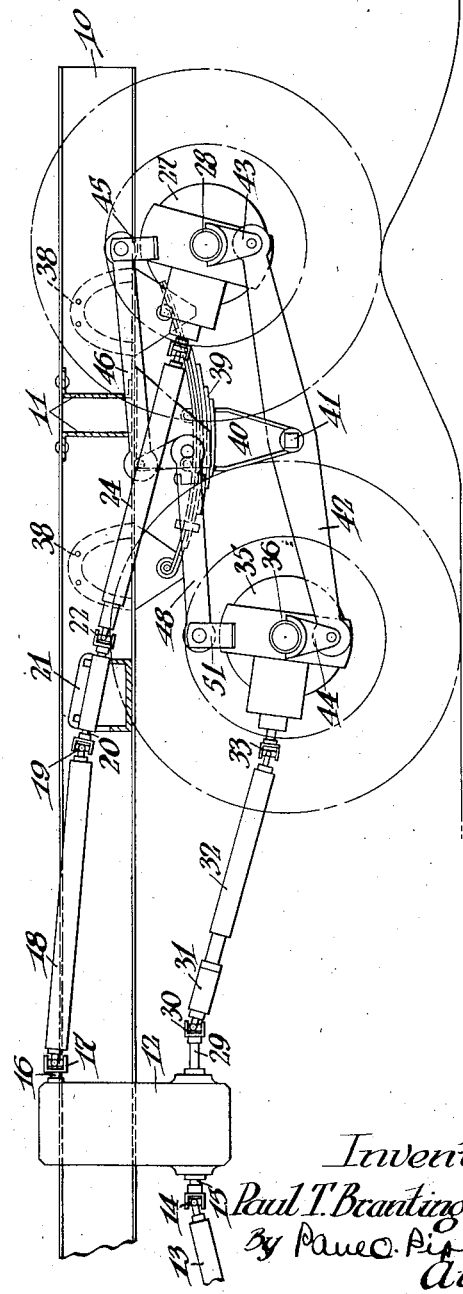
Inventor
Paul T. Brantingham
By Paul O. Pinsel
Atty.

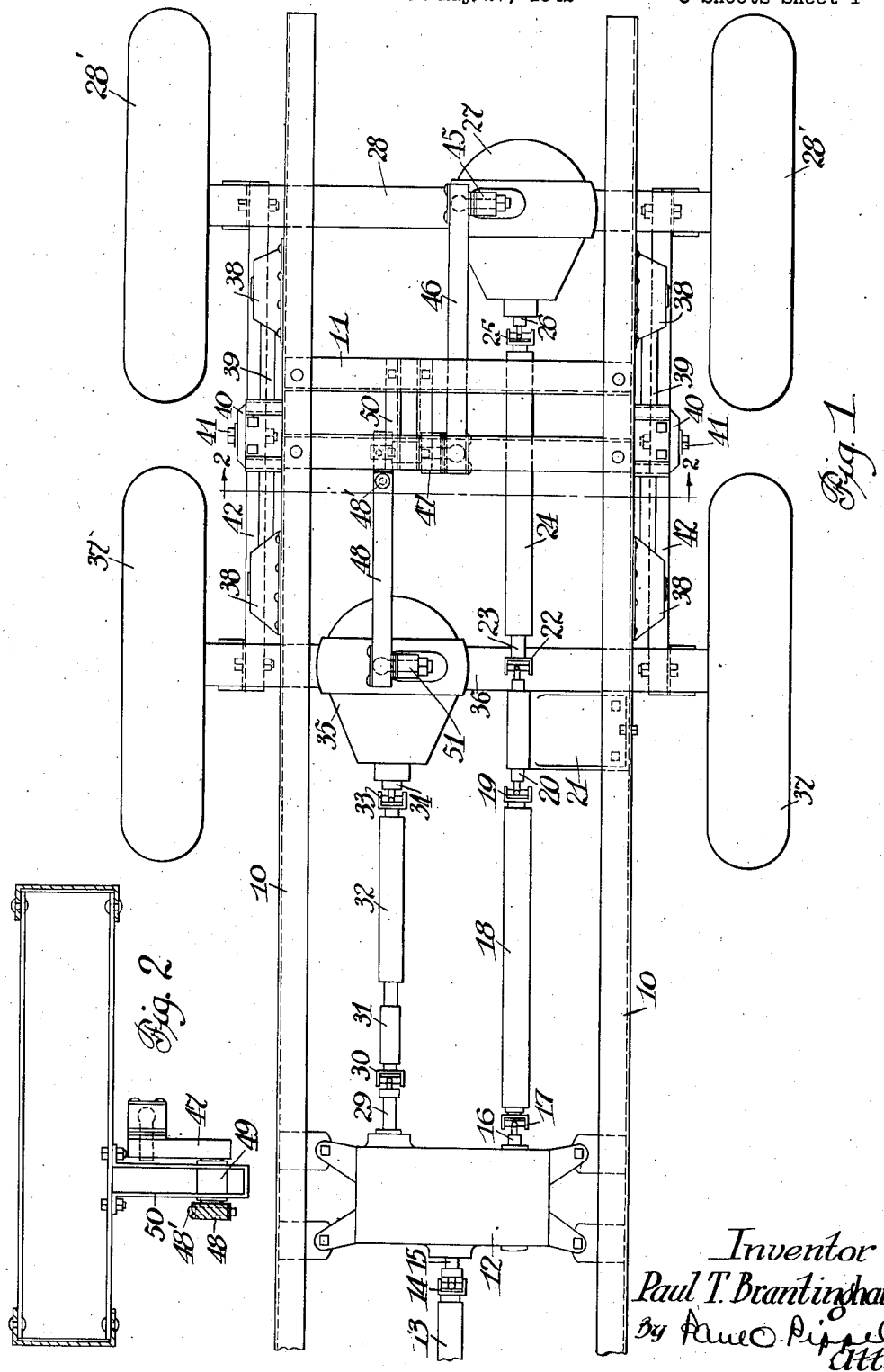

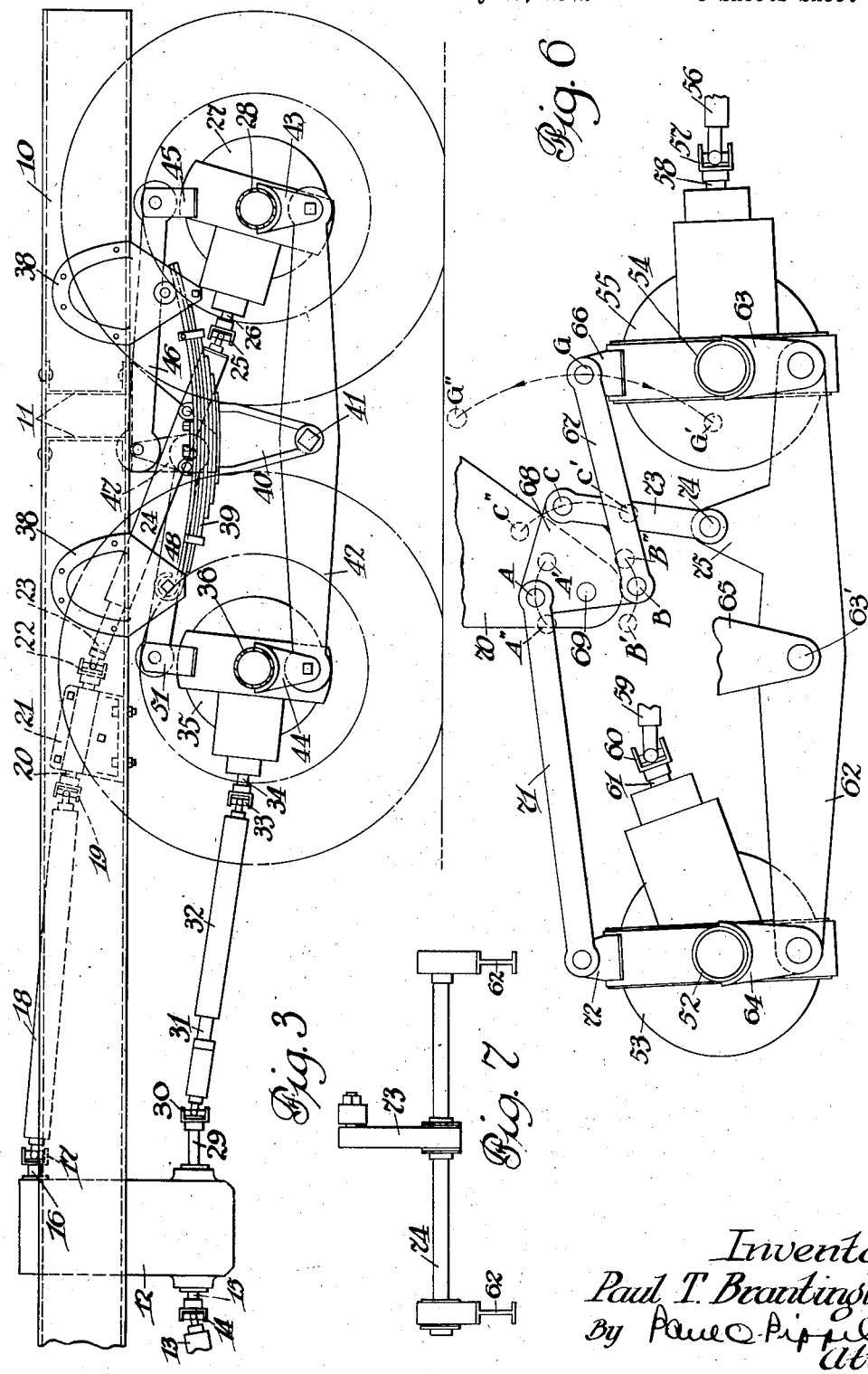

Patented Aug. 22, 1944

2,356,375

UNITED STATES PATENT OFFICE 2,356,375

AUTOMOTIVE VEHICLE

Paul T. Brantingham, Fort Wayne, Ind., assignor to International Harvester Company, a corporation of New Jersey Application May 27, 1942, Serial No. 444,717

10 Claims. (Cl. 180—22)

This invention relates to a wheel suspension system for automotive vehicles. More particularly, it relates to a linkage for mounting drive axles on an automotive vehicle. The principal object of the present invention is to provide a suspension system for live axles of an automatic vehicle operable to maintain correct propeller shaft alignment during rising and falling actions of the wheels relative to the frame of the vehicle. More specifically, the invention relates to a suspension system of the bogey type incorporating at last one driven axle, and to a linkage means for tilting the driven axle during up and down movement to maintain the propeller shaft in as nearly a true alignment with the drive pinion of the axle as possible.

The above object and others which will be apparent from the detailed description to follow, are obtained by a construction such as shown in the drawings, in which Figure 1 is a top plan view of an automotive vehicle having two closely spaced, driven rear axles;

Figure 2 is a section taken on the line 2—2 of Figure 1;

Figure 3 is a side elevation of the construction shown in Figure 1 with the wheels at one side broken away by a section through the axles to better show the suspension system;

Figure 4 is an elevation the same as Figure 3 showing the front axle in an elevated position as when passing over an obstacle;

Figure 5 is similar to Figure 4 with the rear axle shown in elevated position;

Figure 6 shows the linkage and axle structures of a modified form of suspension system in which provision is made for regulating the tilt of each of the axle structures. This system is adapted to be used on the same vehicle construction as the system shown in Figures 1 to 5 inclusive;

Figure 7 is a front elevation of an equalizer structure which connects the side beams of the structure shown in Figure 6.

The portion of the automotive vehicle shown is the rear end of a conventional motor truck having side frame rails 10 and a transverse flanged frame member 11. A power divider 12 is mounted transversely across the mid portion of the frame, being connected by suitable brackets to the frame. A propeller shaft 13, extending from the motor of the truck, is connected by a universal joint 14 to a drive shaft 15 extending into the power divider. A drive shaft 16, extending from the upper portion of the power divider, is connected by a universal joint 17 to a drive shaft 18 which in turn connects by a universal joint 19 to a short shaft 20. Said shaft is rotatably mounted in a bracket 21 secured to one of the side frame members 10. The shaft 20 is connected by a universal joint 22 to one section 23 of a telescopic propeller shaft including a second section 24. Said second section is connected by a universal joint 25 to a pinion shaft 26 extending into a differential housing 27, which is a part of a rear axle structure 28. Said axle structure is conventional in form, housing the usual differential and final drive mechanism, and carrying driving wheels 28' at each end thereof. Only such parts of the drive mechanism have been shown as are necessary to properly describe the suspension system in which the novelty resides.

A second drive shaft 29 projects rearwardly from the lower portion of the power divider 12, being connected by a universal joint 30 to one section 31 of a propeller shaft which is completed by a second section 32. Said second section is connected by a universal joint 33 to a pinion shaft 34 extending into a differential housing 35 which is a portion of an axle structure 36 spaced forwardly from the axle structure 28. Said axle structure houses the final drive mechanism and carries two wheels 37 at the ends thereof.

Each frame member 10 carries a pair of longitudinally spaced spring brackets 38 to which leaf springs 39 are secured. Each leaf spring at its center is connected to a bracket 40 which extends downwardly and is pivotally connected by a pivot pin 41 with a beam, or bolster, 42. Said beam extends under the axle structures 28 and 36, being connected thereto, respectively, by downward depending brackets 43 and 44. The pivotal connections of the beams 42 with the brackets 43 has been shown only diagrammatically, it being understood that flexible joints are necessary to provide for tilting of one axle about a longitudinal axis relative to the other. This construction is a part of the prior art and has not been shown in detail in the drawings.

An upwardly projecting bracket 45 is secured to the upper portion of the rear differential housing 27. Said bracket forms a means of connecting a link 46 which extends forwardly and is connected to an upwardly projecting arm 47 which is carried for movement with a forwardly extending link 48. The arm 47 and the link 48 are connected together by a transverse shaft portion which is rotatably mounted in a sleeve 49 carried by a bracket 50 secured to and extending downwardly from the transverse frame member. The rear end of the link 48 is pivotally connected on a vertical axis by a pin 48' to the shaft portion. The forward end of the link 48 is pivotally connected to a bracket 51 secured to the upper portion of the forward differential housing 35.

Referring to Figure 3, it will be noted that the drive shaft 29 is angled only a few degrees with respect to the connecting propeller shaft consisting of the sections 31 and 32. Likewise, the section 32 of the propeller shaft is almost in longitudinal alignment with the shaft 34. In Figures 4 and 5, which represent two different positions of the axles relative to one another, there is an increase in the angularity of the propeller shaft with respect to its driving and driven shafts. This angularity, however, even during maximum vertical movements of the axle structure, is not excessive and may be tolerated in the standard double Y type of universal joints.

Referring to Figure 3, it is noted that there is a relatively small angularity between the shaft 20 and the propeller shaft consisting of the sections 23 and 24, and that there is very little angularity between the section 24 and the pinion shaft 26. If the truck were loaded so as to depress the spring a substantial amount, there would be almost a direct alignment of the propeller shaft with its driving and driven shafts. This would represent an ideal condition to prevent undue strain and wear on the universal joints. With a conventional parallel linkage for suspending the axle structures, there is a greater increase in angularity, as shown by the front axle structures in Figures 4 and 5, when there is a substantial vertical displacement of the axle structures relative to each other. This increase in angularity is inherently more in the drive to the rear axle due to the necessity of bringing the drive shaft downwardly from an attaching point on the frame sufficiently high to clear the forward axle during extreme relative movement of the two axle structures. To reduce the angularity to a minimum, the linkage shown in the drawings has been devised. By forming the link 48 as a bell crank with the upwardly extending arm 47, the link 46 may be connected as shown so as to provide a compound linkage rather than a simple parallelogram linkage. When the front axle structure moves upwardly to an extreme position, as shown in Figure 4, the center of connection of the link 46 moves rearwardly, thereby tipping the rear axle structure about a transverse axis to the position shown. This tilting acts to align the pinion shaft 26 with the propeller shaft, thereby maintaining the angularity at a minimum and with the resulting minimum wear and strain on the universal joint 25.

When the opposite action takes place, as shown in Figure 5, the downward movement of the forward axle structure 36 moves the arm 47 forwardly, thereby tipping the rear axle structure 28 about a transverse axis with the upper portion moving forwardly. This action acts to maintain alignment of the pinion shaft 26 with the rear section 24 of the connecting propeller shaft, thereby reducing strain and wear on the universal joint 25. It should also be stated that any reduction in strain on a double Y type of universal joint also reduces vibration in the shafting which has an adverse influence on the life of the gears.

Figure 6 shows a rear axle structure 52 having a differential housing 53 and a forward axle structure 54 having a differential housing portion 55. A portion of a propeller shaft 56 is shown connected by a universal joint 57 with a pinion shaft 58 for driving the axles of the forward axle structure. A propeller shaft 59 connected by universal joint 60 with a pinion shaft 61, shows the drive for the rear axle structure. A beam 62 connected by a bracket 63 to the forward axle structure, and a bracket 64 to the rear axle structure, is connected by a pivot pin 63' with a spring attaching bracket 65. It is understood that this bracket is the same as the brackets 40 described in Figures 1 to 5 inclusive, and that there is a beam at each side of the axle structures adapted to be connected to springs and to a frame structure, as shown in Figure 1. Also, it is to be understood that the propeller shafts 56 and 59 are adapted to be driven from a power divider in the same manner as the propeller shafts of Figures 1 to 5 inclusive.

A bracket 66 secured to the top of the differential housing 55 forms a pivotal connecting point for a link 67, which is also pivotally connected to a force-transmitting member 68. Said member is pivotally mounted on a transverse axis by a pin 69 on a bracket 70. Said bracket is adapted to be secured to the cross frame member 11 of a frame in the same manner as the bracket 50 previously described. A second link 71 pivotally connected to the member 68 is pivoted to a bracket 72 mounted at the top of the differential housing 53 of the rear axle structure. A third link 73 is pivotally connected to an equalizer member 74 pivotally connected at its ends to extensions 75 on the beams 62. This equalizer construction is shown on a small scale in Figure 7.

Referring to Figure 6, when the forward axle structure moves upwardly, the point G may move upwardly as far as the point G'', the direction of movement being indicated by an arrow and the center of the pivot point of the link 67 being shown in dotted lines. During such movement, the point B, which represents the attaching axis of the link 67 on the member 68, moves upwardly to the center B''. This action rotates the member 68 to bring the pivot axis A of the link 71 on the member 68 to the point A'', thereby pushing the top of the axle structure 53 rearwardly and bringing it into a position to maintain a close alignment of the pinion shaft 61 with the propeller shaft 59. At the same time the upper portion of the axle structure 55 is pushed forwardly, thereby maintaining a close alignment of the pinion shaft 58 with the propeller shaft 56.

Actually the link motion above described is brought about by the link 73, which, by being connected to the member 68 on the axis C, determines the amount of pivoting of the member 68. It will be noted that the point C moves to the point C'' during the movement previously described. The provision of this third link makes a patent linkage the geometry of which can be calculated to give the proper angular movement to both axle structures to attain the best angular relation between the propeller shafts and their driving and driven shafts.

A second set of positions of the various axes of the pivot members has been shown. As the axis G moves down to the point G', the axis C moves down to the point C', thereby rotating the member 68 to bring the axis B to the point B' and the axis A to the point A'. By this action the link 67 is moved rearwardly thereby tipping the axle structure 55 to bring the pinion shaft 58 into an upwardly inclined angle. At the same time, the link 71 is moved forwardly to tip the axle structure 53 forwardly at its top portion to move the pinion shaft 61 in a downward direction thereby maintaining a close alignment with the drive shaft 59.

By means of the construction shown in Figure 6, corrections may be obtained on both axle structures to thereby maintain the alignment of the propeller shafts and their driving and driven shafts within such narrow angular range of movement as to materially lengthen the life of the universal joints and to reduce vibration to a minimum.

It is to be understood that applicant has shown only two preferred embodiments of his improved suspension system for automotive vehicles, and that he claims as his invention all modifications falling within the scope of the appended claims.

What is claimed is:

1. In combination, a vehicle frame structure, transversely spaced longitudinally extending beams pivotally secured at their mid-points to the frame structure, transversely extending axle structures pivotally secured adjacent their ends to said beams, a stabilizing linkage including links spaced vertically from the beams, said linkage being connected to the axle structures and to the frame structure, one of said links having one end pivotally connected to the frame structure, said end being provided with a vertically extending arm to which the other link is pivotally connected, a pinion shaft projecting from one of said axle structures, a propeller shaft carried by the frame structure, a second propeller shaft connected by universal joints to said first-mentioned propeller shaft and to said pinion shaft, and means included in said linkage to tilt said one axle structure about a transverse axis upon vertical movement of another of said axle structures relative to the frame and in an angular direction effective to maintain the second propeller shaft in substantial alinement with the pinion shaft.

2. In a vehicle, the combination of a frame, a pair of longitudinally arranged leaf springs at transversely spaced locations secured to said frame, longitudinally extending bolster members pivotally secured at their mid-points to the mid-points of said springs, transversely extending axle structures pivotally secured to said members, one of said structures housing a driving mechanism including a projecting stub drive shaft, a stabilizing link pivotally connected to said structure above its connections with the bolster members and to the frame, said link having an upwardly projecting arm, a second link pivotally connected to said arm and to the other axle structure above its connections with the bolster members, a propeller shaft mounted on the frame, and a second rearwardly extending propeller shaft connected by universal joints to said first-mentioned propeller shaft and to the stub drive shaft and being in substantial axial alinement with said stub drive shaft, said links forming stabilizing means effective to tilt said one axle structure about a transverse axis upon movement of the other of said axle structures relative to the frame in a direction for maintaining the second mentioned propeller shaft against substantially angular movement with respect to the stub drive shaft.

3. In a vehicle, the combination of a frame, a pair of longitudinally arranged leaf springs at transversely spaced locations secured to said frame, longitudinally extending bolster members pivotally secured at their mid-points to the mid-points of said springs, transversely extending axle structures pivotally secured beneath their axes to said members, one of said structures housing a driving mechanism including a projecting stub drive shaft, a stabilizing link pivotally connected to the upper portion of the said structure above its axis and to the frame, said link having an upwardly projecting arm, a second link pivotally connected to said arm and to the other axle structure above its axis, a propeller shaft mounted on the frame, and a second rearwardly extending propeller shaft connected by universal joints to said first-mentioned propeller shaft and to the stub drive shaft and being in substantial axial alinement with said stub drive shaft, said links forming stabilizing means effective to tilt said one axle structure about a transverse axis upon movement of the other of said axle structures relative to the frame in a direction for maintaining the second-mentioned propeller shaft against substantially angular movement with respect to the stub drive shaft.

4. In combination, a vehicle frame, a pair of longitudinally arranged leaf springs at transversely spaced locations secured to said frame, longitudinally extending bolsters pivotally secured at their mid-points to the mid-points of said springs, transversely extending axle structures pivotally secured beneath their axes to said bolsters, each of said structures being provided with a driving mechanism including a forwardly projecting pinion shaft, a force transfer member pivotally mounted on the frame, a stabilizing link pivotally connected to the upper portion of the forward axle structure above its axis and to said member, a second link pivotally connected to said member and to the rear axle structure above its axis, a third link pivotally connected to said member and to the bolsters, drive shafts mounted on the frame, and rearwardly extending propeller shafts connected by universal joints to said shafts and to the pinion shafts and each being in substantial axial alinement with the corresponding pinion shaft, said links forming stabilizing means effective to tilt said axle structures about a transverse axis upon movement thereof relative to the frame in a direction for maintaining the propeller shafts against substantially angular movement with respect to the pinion shafts.

5. In combination, a vehicle frame, a pair of longitudinally arranged leaf springs at transversely spaced locations secured to said frame, longitudinally extending bolsters pivotally secured at their mid-points to the mid-points of said springs, an equalizer member pivotally secured to said bolster at points equally spaced from said mid-points, transversely extending axle structures pivotally secured beneath their axes to said bolsters, each of said structures being provided with a driving mechanism including a forwardly projecting pinion shaft, a force transfer member pivotally mounted on the frame, a stabilizing link pivotally connected to the upper portion of the forward axle structure above its axis and to said member, a second link pivotally connected to said member and to the rear axle structure above its axis, a third link pivotally connected to said member and to a mid-point of the equalizing member, drive shafts mounted on the frame, and rearwardly extending propeller shafts connected by universal joints to said shafts and to the pinion shafts and each being in substantial axial alinement with the corresponding pinion shafts, said links forming stabilizing means effective to tilt said axle structures about a transverse axis upon movement thereof relative to the frame in a direction for maintaining the propeller shafts against substantially angular movement with respect to the pinion shafts.

6. In combination, a vehicle frame, a pair of longitudinally extending leaf springs secured to said frame, longitudinally extending bolsters pivotally secured adjacent their mid-points to the mid-points of said springs, transversely extending axle structures pivotally secured beneath their axes to said bolsters, each of said structures having a driving mechanism including a projecting drive shaft, a stabilizing linkage connecting the upper portions of said structures above their axes to the frame, said linkage including a link pivoted on one axle structure and on the frame, and a second link pivoted on the other axle structure and on the first-named link at a point spaced substantially vertically from its pivotal connection on the frame, a power input shaft mounted on the frame, a power divider driven by said power input shaft, two vertically offset shafts driven by said power divider, driving structure operatively connected to one of said offset shafts and including a propeller shaft in substantial alinement with one of the projecting drive shafts and connected thereto by a universal joint, a second driving structure operatively connected to the other of said offset shafts and including a propeller shaft in substantial alinement with the other of the projecting drive shafts and connected thereto by a universal joint, said linkage being operative to tilt said other axle structure about a transverse axis upon movement of the one axle structure relative to the frame in a direction for maintaining the propeller shafts against excessive angular movement with respect to their projecting drive shafts.

7. In combination, a vehicle frame structure, transversely spaced longitudinally extending beams pivotally secured at their mid-points to the frame structure, transversely extending axle structures pivotally secured adjacent their ends to said beams, a stabilizing linkage including links spaced vertically from the beams, said linkage being connected to the axle structures and to the frame structure, one of said links having one end pivotally connected to the frame structure, said link being operatively associated with the other of said links, a pinion shaft projecting from one of said axle structures, a propeller shaft carried by the frame structure, a second propeller shaft connected by universal joints to said first-mentioned propeller shaft and to said pinion shaft, and means included in said linkage to tilt said one axle structure about a transverse axis upon vertical movement of another of said axle structures relative to the frame and in an angular direction effective to maintain the second propeller shaft in substantial alinement with the pinion shaft.

8. In combination, a vehicle frame structure, transversely spaced longitudinally extending beams pivotally secured at their mid-points to the frame structure, transversely extending axle structures pivotally secured adjacent their ends to said beams, a stabilizing linkage comprising two links, the first of said links pivotally joined at one end to one axle structure and at its other end to said frame, the second of said links pivotally joined to the other axle structure, means interposed between said first and second links for effecting substantial longitudinal shifting of said second link upon arcuate swinging of said first link, a pinion shaft projecting from said one axle structure, a propeller shaft carried by the frame structure, a second propeller shaft connected by universal joints to said first-mentioned propeller shaft and to said pinion shaft, and means included in said linkage to tilt said one axle structure about a transverse axis upon upward movement of the other of said axle structures relative to the frame and in an angular direction effective to maintain the second propeller shaft in substantial alinement with the pinion shaft.

9. In combination, a vehicle frame, a pair of longitudinally arranged leaf springs at transversely spaced locations secured to said frame, longitudinally extending bolsters pivotally secured at their mid-points to the mid-points of said springs, transversely extending axle structures pivotally secured beneath their axes to said bolsters, each of said structures being provided with a driving mechanism including a forwardly projecting pinion shaft, a stabilizing linkage comprising three links, the first of said links pivotally joined at one end to one axle structure, the second of said links pivotally joined to the other axle structure, the third of said links pivotally joined to the bolsters, means interposed between the other ends of the three links whereby substantially vertical movement of the third link caused by rocking movement of the bolsters will effect a substantially longitudinal movement of the first and second links, drive shafts mounted on the frame, and rearwardly extending propeller shafts connected by universal joints to said shafts and to the pinion shafts and each being in substantial axial alinement with the corresponding pinion shaft, said links forming stabilizing means effective to tilt said axle structures about a transverse axis upon movement thereof relative to the frame in a direction for maintaining the propeller shafts against substantially angular movement with respect to the pinion shafts.

10. In combination, a vehicle frame, a pair of longitudinally arranged leaf springs at transversely spaced locations secured to said frame, longitudinally extending bolsters pivotally secured at their mid-points to the mid-points of said springs, transversely extending axle structures pivotally secured beneath their axes to said bolsters, each of said structures being provided with a driving mechanism including a forwardly projecting pinion shaft, a stabilizing linkage comprising two links, the first of said links pivotally joined at one end to one axle structure, the second of said links pivotally joined at one end to the other axle structure, means interposed between the other ends of the two links and the bolsters whereby rocking of the bolsters will effect a substantially longitudinal movement of each of the two links, drive shafts mounted on the frame, and rearwardly extending propeller shafts connected by universal joints to said shafts and to the pinion shafts and each being in substantial axial alinement with the corresponding pinion shaft, said links forming stabilizing means effective to tilt said axle structures about a transverse axis upon movement thereof relative to the frame in a direction for maintaining the propeller shafts against substantially angular movement with respect to the pinion shafts.

PAUL T. BRANTINGHAM.